UNITED STATES PATENT OFFICE.

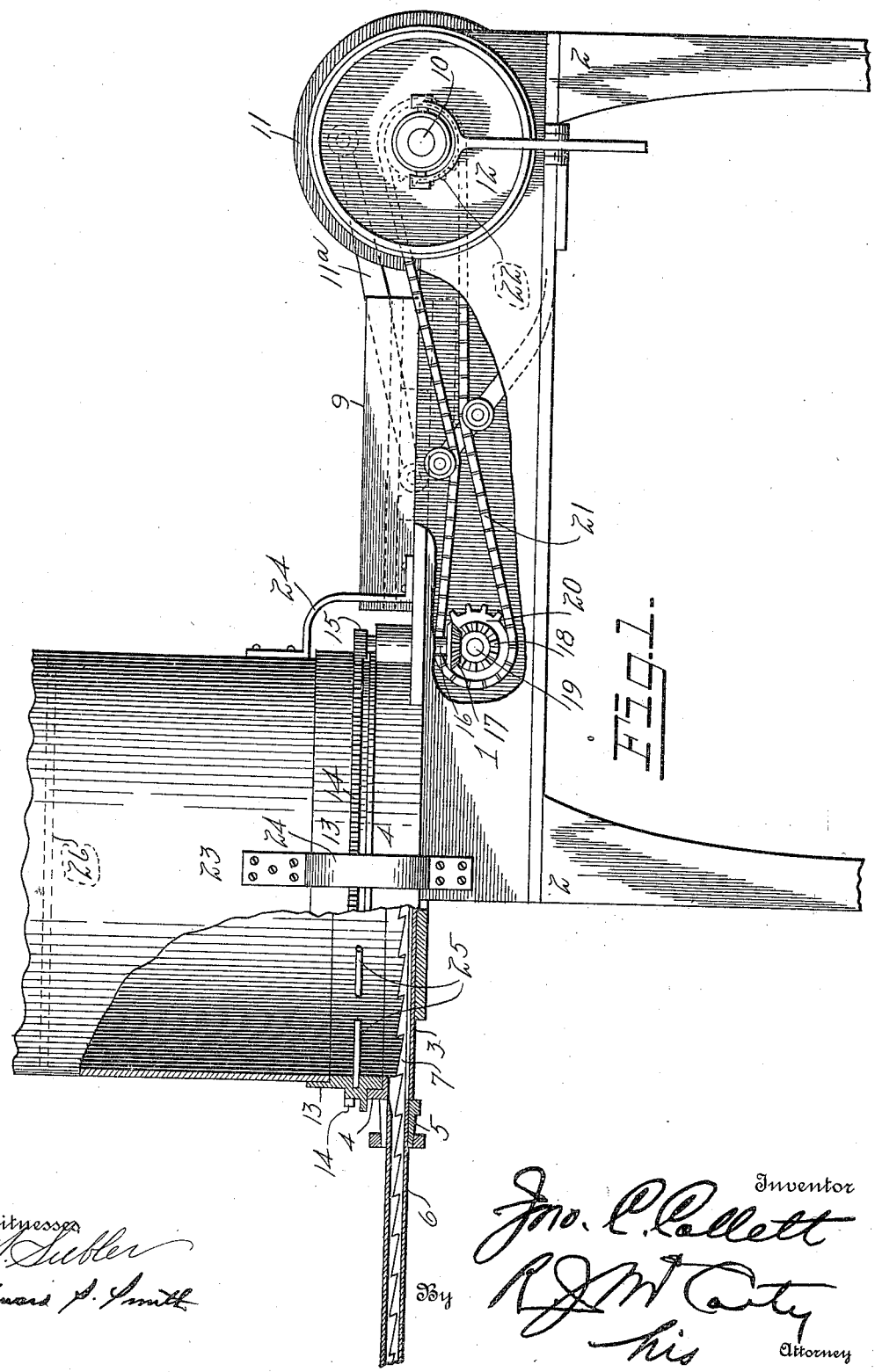

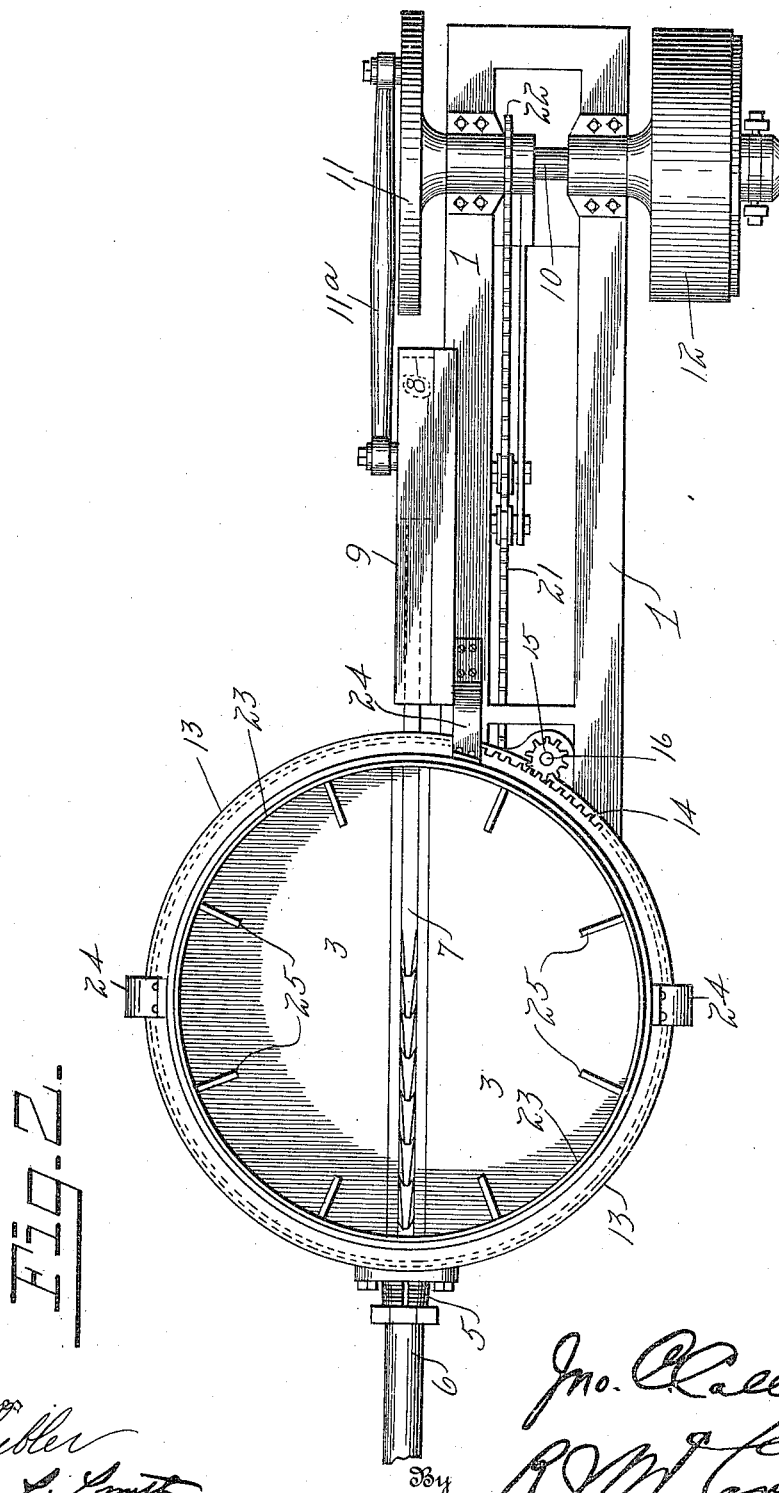

JOHN C. COLLETT, OF DAYTON, OHIO, ASSIGNOR TO THE FOGELSONG MACHINE COMPANY, OF DAYTON, OHIO, A CORPORATION OF OHIO.

HORSE-COLLAR-STUFFING MACHINE.

964,463.

Specification of Letters Patent.  Patented July 12, 1910.

Application filed January 29, 1910. Serial No. 540,755.

*To all whom it may concern:*

Be it known that I, JOHN C. COLLETT, citizen of the United States, residing at Dayton, in the county of Montgomery and State of Ohio, have invented certain new and useful Improvements in Horse-Collar-Stuffing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stuffing machines and more particularly to horse collar stuffing machines.

Straw as it comes from the bale is usually of considerable length, and heretofore it has been the custom to cut the same into short lengths before placing the material in the hopper of the machine. This previous preparation of the straw required time as well as labor which are avoided in the use of the present invention. In the use of the present invention the straw is taken from the bale in its original condition, towit, in strands of considerable lengths, and is thrown into the hopper in a tangled mass and is successfully fed to the casing to be stuffed in such condition. In order to feed straw in such a tangled condition it is important that there be nothing on the interior of the hopper which will prevent it from being properly presented to the reciprocating feed rod. In other words, the straw in the hopper must be unobstructed from below and free to engage the feed rod as said straw is carried around. To meet these conditions the straw must be carried around by means engaging its circumference so that the body of the straw at the center outwardly may be free to engage the feed rod.

It is therefore the primary object of my invention to provide means for feeding long tangled straw to the reciprocating feed rod of a collar stuffing machine, which engages the straw at its circumference and carries it around in a body immediately above the feed rod.

A further object of the invention is to provide means for carrying around in a body in the manner specified, only a sufficient quantity of the feeding material to keep the reciprocating feed rod supplied, and to thus avoid imposing upon the working parts of the machine any more work than is necessary. In order to accomplish this the feeding devices are mounted upon a rotating member at the bottom of the hopper and extend inwardly a sufficient distance to engage the straw at the circumference of the body thereof.

In the accompanying drawings, Figure 1 is a side elevation of my improved collar stuffing machine with parts broken away to show the feeding devices. Fig. 2 is a top plan view of the machine.

In the specification and drawings similar reference characters indicate corresponding parts.

In said drawings the base or frame-work 1 constitutes the bed of the machine which is supported on standards 2 and supports at its forward end a ring or circular plate 3 which is provided with an upturned circumferential flange 4. Extending from the flange 4 and attached by means of a clamp 5 is a stuffing tube 6 through which the straw is fed to the casing to be stuffed in a well known manner. Within said tube 6 and extending across the upper side of the plate 3 is a feed rod 7 of well known construction. The rear end of said feed rod is attached to a cross head 8 mounted in guides 9 on the base or frame of the machine. The said cross head and feed rod are reciprocated from a shaft 10 journaled on the frame and provided with a crank plate 11 which is connected to the cross head 8 by means of a connecting rod 11ª. The shaft 10 is also provided with a clutch pulley 12 by means of which it is rotated.

Mounted upon the flange 4 is a rotatable ring or member 13 which is provided with teeth 14 which mesh with those of a pinion 15 on a vertical shaft 16. The rotatable member 13 is adapted to carry around the stuffing material and to properly present the same to the reciprocating feed rod 7 through the following devices. Extending from the inner side of said member 13 is a suitable number of pins 25. These pins in the rotation of the ring or member 13 engage the straw in its tangled mass at its circumference and carry the same around, presenting the straws to the feed rod in a manner which enables said feed rod to stuff it into the collar or casing. The pins 25 terminate a sufficient distance away from the center of the rotating member 13 upon which they are carried, to avoid forming any obstruction that might prevent the straw in its tangled mass from engaging the feed rod. The shaft 16 upon which the pinion 15 is mounted, is driven from the shaft 10 through a train of gearing such as a miter gear 17 on the lower end of shaft 16, a similar gear 18 on shaft 19 meshing with gear 17, the shaft 19 being journaled in the bed or frame of the machine. The said shaft 19 is also provided with a sprocket wheel 20 driven from a chain 21 which, in turn, is driven by a sprocket wheel 22 on the shaft 10.

It will be seen that when the shaft 10 is rotated, the reciprocating feed rod 7 will be actuated, and the rotating member 13 with its internal projections 25 will also be rotated to properly present the straw to the feed rod. Mounted above the rotating member 13 is a hopper 23 which is supported on the bed or frame work of the machine by means of a suitable number of brackets 24. These brackets do not permit the weight of the hopper to interfere with the rotation of the member 13. The inside diameter of the hopper 23 is preferably that of the inside diameter of the rotating member 13. This hopper receives the straw from the bale in the condition hereinbefore specified and there being no obstructions on the interior of the hopper the straw readily finds its way to the feed rod immediately above which it is carried around by the pins 25 engaging its circumference in the manner hereinbefore specified. Within the hopper is a pressure plate 26 placed on top of the straw and serving to properly press the material downwardly to the rotating fingers 25 and the feed rod, and to thus insure a constant feed of the straw.

It will be understood from the above description that when the machine is in operation, the straw in a more or less tangled mass will be presented to the feed rod in ever-changing position; that is to say, upon the first round of the body of straw, some of the individual strands may not be presented to the feed rod in a proper manner for the latter to engage the same, but upon the next round of the straw or at some subsequent revolution of the body of straw these strands as well as others will be directed across the feed rod to be engaged thereby and to be fed into the pipe 6 and thence into the casing.

I claim:

1. In a machine of the type specified, the combination with a hopper, of a rotating member below said hopper, pins extending inwardly from said rotating member and engaging the circumference of the body of straw inclosed by said rotating member to carry the same around, a reciprocating feed rod below said rotating member adapted to engage the straw thus being carried around by said pins, and means for rotating said member, substantially as specified.

2. In a machine of the type specified, the combination with a stationary hopper, of a rotating member below said hopper, said rotating member having a plurality of pins projecting inwardly and terminating a substantial distance from the axis of said rotating member, said pins being adapted to engage the straw at its circumference to carry the same around without obstructing the passage of the straw below said pins, a reciprocating feed rod below said pins and adapted to engage the straw while being carried around by said pins, and means for rotating said rotating member.

In testimony whereof I affix my signature, in presence of two witnesses.

JOHN C. COLLETT.

Witnesses:
MATTHEW SIEBLER,
R. J. MCCARTY.